US008428515B1

(12) United States Patent
Oliver

(10) Patent No.: US 8,428,515 B1
(45) Date of Patent: Apr. 23, 2013

(54) RFID TAGS HAVING A RECTIFIER CIRCUIT INCLUDING A DUAL-TERMINAL RECTIFIER DEVICE

(75) Inventor: Ronald A. Oliver, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 250 days.

(21) Appl. No.: 13/022,115

(22) Filed: Feb. 7, 2011

Related U.S. Application Data

(62) Division of application No. 11/484,523, filed on Jul. 10, 2006, now Pat. No. 7,907,899.

(51) Int. Cl.
*H04B 7/00* (2006.01)

(52) U.S. Cl.
USPC .... 455/41.2; 455/333; 455/343.4; 340/572.7; 327/343; 363/125

(58) Field of Classification Search .................. 455/41.2, 455/333, 334, 343.1–343.4; 340/572.1, 572.5, 340/572.7, 825.62, 825.69; 327/389, 343, 327/534, 535; 363/125, 127
See application file for complete search history.

(56) References Cited

U.S. PATENT DOCUMENTS

| 6,989,750 B2 | 1/2006 | Shanks et al. | |
| 7,288,970 B2 * | 10/2007 | Bertin | 326/120 |

OTHER PUBLICATIONS

EPCglobal, Inc, "Specification of RFID Air Interface-EPC Radio-Frequency Identity Protocols Class-1 Generation-2 UHF RFID Protocol for Communications at 860 MHz-960 MHz, Version 1.0.8." (a.k.a. "The Gen 2 Spec") EPCglobal Inc. Dec. 14, 2004.
EPCglobal, Inc "Specification of RFID Air Interface-EPC Radio-Frequency Identity Protocols Class-1 Generation-2 UHF RFID Protocol for Communications at 860 MHz-960 MHz, Version 1.1.0." (a.k.a. "The Gen 2 Spec") EPCglobal Inc. Dec. 17, 2005.
Masui, et al., "A 13.56MHz Identification Transponder Integrated Circuit With a Dedicated CPU", IEEE International Solid-State Circuits Conference, ISSCC99, Session 9, Paper TA 9.1, Jun. 1999, 162-163.

* cited by examiner

*Primary Examiner* — Nhan Le
(74) *Attorney, Agent, or Firm* — Turk IP Law, LLC

(57) ABSTRACT

Apparatus and method for generating a rectified output signal in a RFID tag from first and second alternating signals. A dual-terminal rectifier device has first and second input terminals to which the first and second alternating signals are applied, and further has a gate configured to form a conductive channel to electrically couple the first and second input terminals to the output terminal in response to a gate voltage. The dual-terminal rectifier device is configured to rectify a combination of the alternating input signals applied to the input terminals of the semiconductor device to generate a rectified output signal at an output terminal.

16 Claims, 17 Drawing Sheets

*RECTIFIER STAGE WITH BIAS CIRCUITS*

RFID SYSTEM

RFID TAG

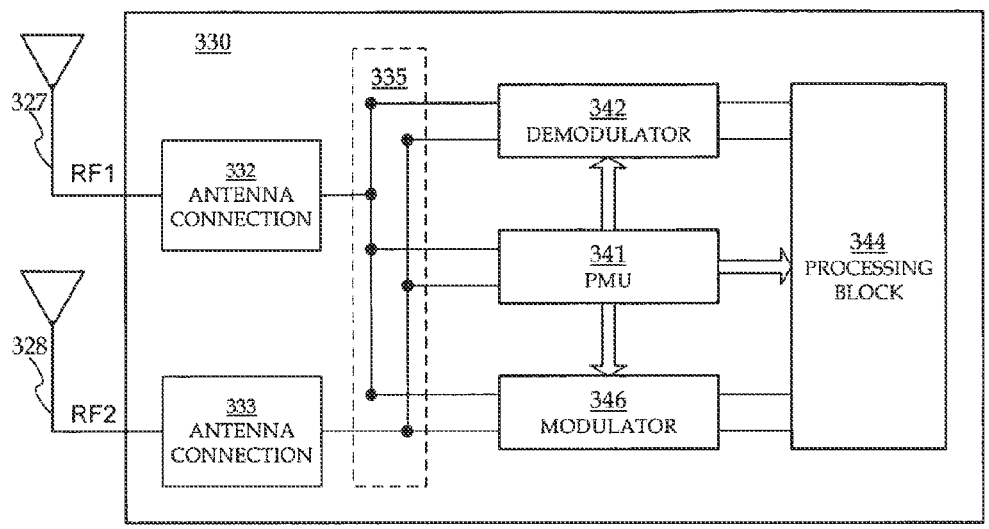
FIGURE 3A  *RFID TAG CIRCUIT*
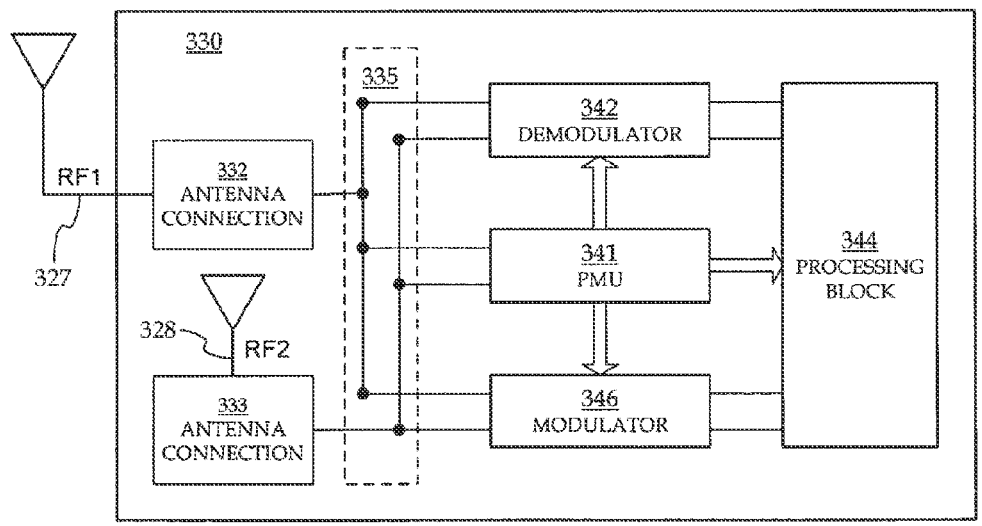
FIGURE 3B  *RFID TAG CIRCUIT*

COMPONENTS OF POWER
MANAGEMENT UNIT

*MULTI-STAGE RECTIFIER CIRCUIT*

RECTIFIER-PUMP STAGE

*NUMBERING OF NODES*

*VOLTAGES AT SUCCESSIVE NODES*

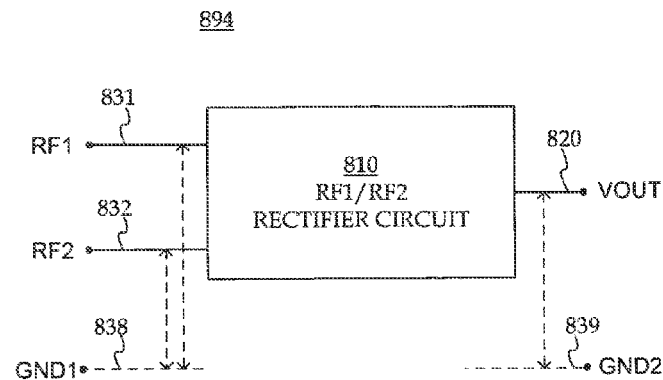
FIGURE 8      *POWER RECTIFIER*
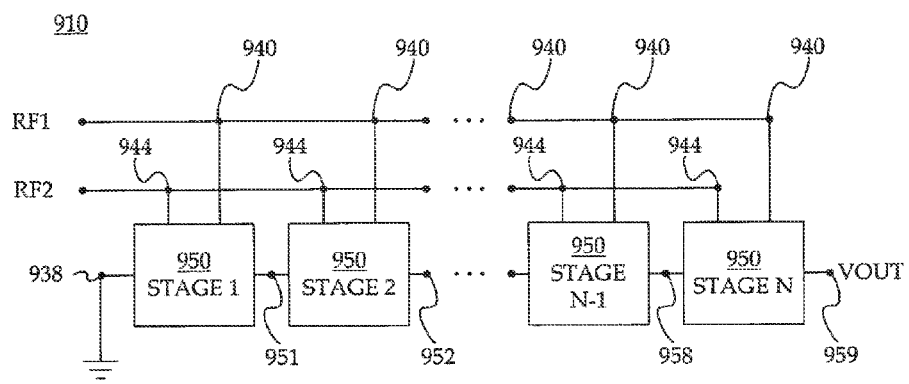
FIGURE 9      *MULTI-STAGE RECTIFIER CIRCUIT*

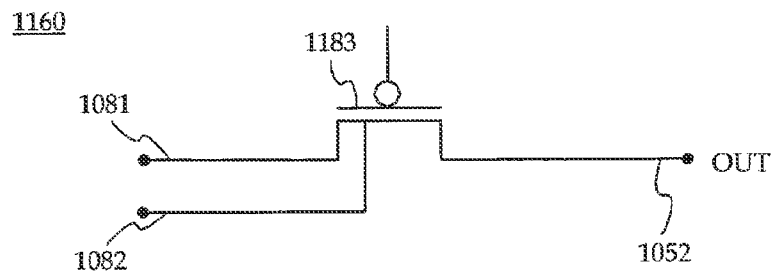
FIGURE 11     *DUAL-TERMINAL RECTIFIER DEVICE*
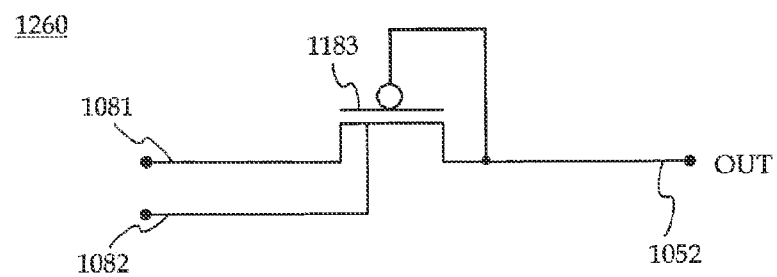
FIGURE 12     *DUAL-TERMINAL RECTIFIER DEVICE*
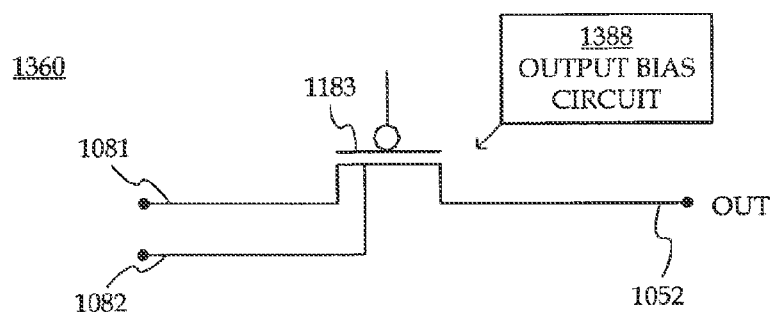
FIGURE 13     *DUAL-TERMINAL RECTIFIER DEVICE WITH BIAS CIRCUIT*

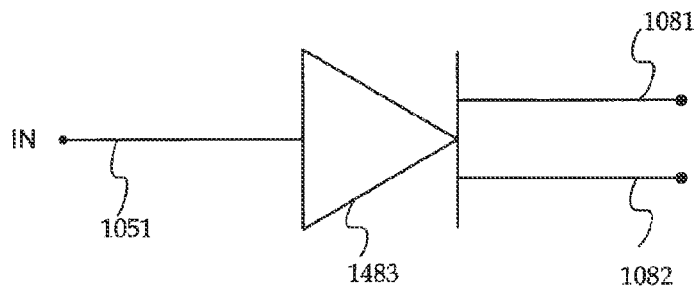
FIGURE 14  *DUAL-TERMINAL RECTIFIER INPUT STAGE*
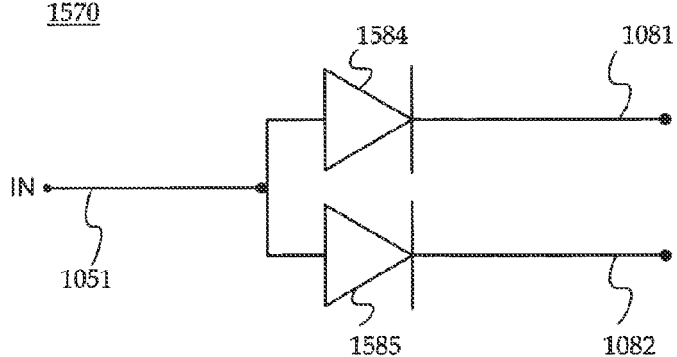
FIGURE 15  *DUAL DEVICE RECTIFIER INPUT STAGE*

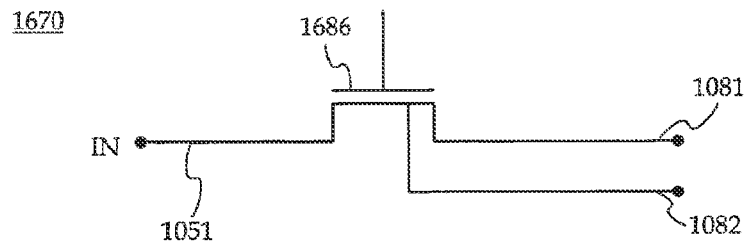
FIGURE 16   *DUAL-TERMINAL RECTIFIER INPUT STAGE*
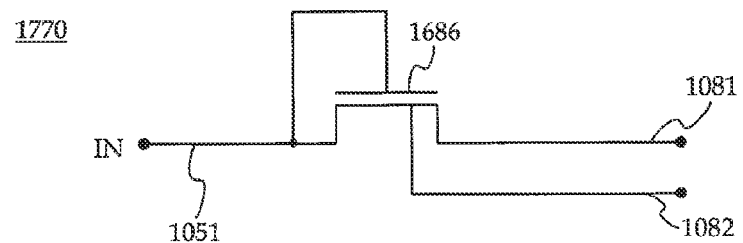
FIGURE 17   *DUAL-TERMINAL RECTIFIER INPUT STAGE*
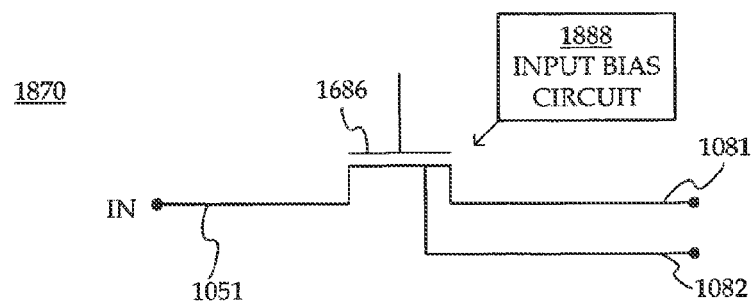
FIGURE 18   *DUAL-TERMINAL RECTIFIER INPUT STAGE WITH BIAS CIRCUIT*

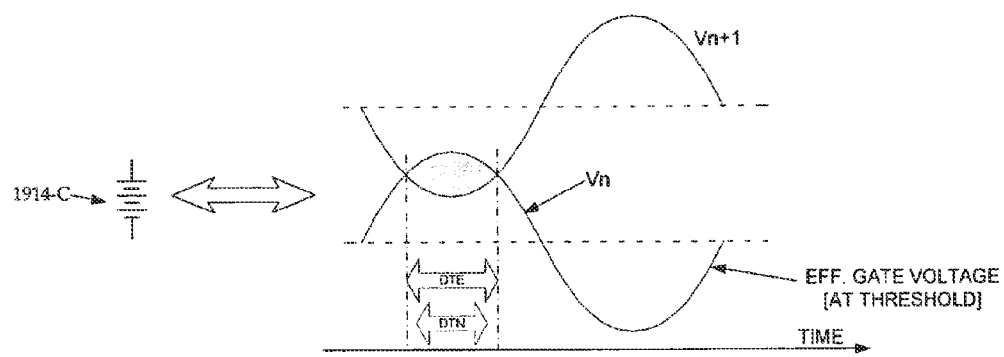
FIGURE 19A  *SETTING FOR HIGH EFFICIENCY*
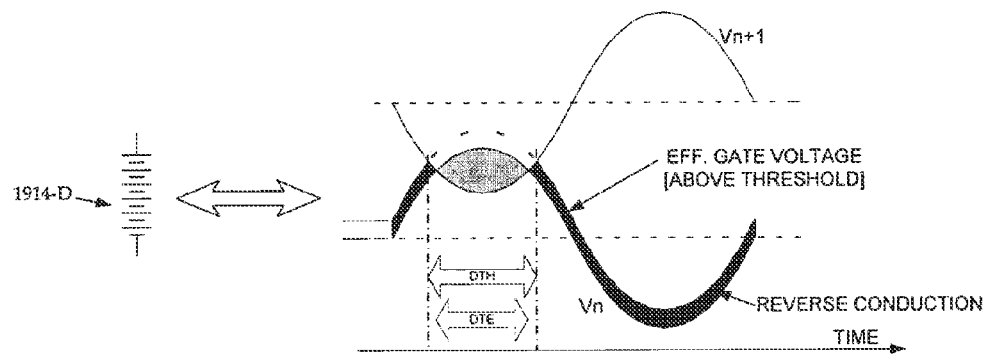
FIGURE 19B  *SETTING FOR HIGH POWER*

RFID TAGS HAVING A RECTIFIER CIRCUIT INCLUDING A DUAL-TERMINAL RECTIFIER DEVICE

RELATED APPLICATIONS

This utility patent application is a divisional of U.S. patent application Ser. No. 11/484,523, filed Jul. 10, 2006. The benefit of the earlier filing date of the parent application is hereby claimed under 35 U.S.C. §120.

TECHNICAL FIELD

The present description addresses the field of Radio Frequency IDentification (RFID) systems, and more specifically, to RFID tags having at least one of voltage rectifier circuits and charge pump circuits.

BACKGROUND

RFID systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. Circuitry for the RFID tag is conventionally implemented as an integrated circuit (IC) that is formed on a semiconductor die. Due to various reasons, such as manufacturing cost, power efficiency, and consumer demands, it is desirable to continually miniaturize the circuitry for the RFID tag. As a result, circuit designers are constantly seeking improved designs that allow for more efficient utilization of space on the semiconductor die on which the IC for the RFID tag is formed.

For example, in earlier RFID tags, the power management section included an energy storage device, such as a battery. RFID tags with an energy storage device are known as active tags. However, advances in circuit design and semiconductor technology have miniaturized the electronics so much that an RFID tag can be powered solely by the RF signal it receives. Such RFID tags do not include an energy storage device, and are called passive tags.

Passive tags typically include at least one of rectifier circuits and charge pump circuits for harvesting usable power from the RF signal received via the antenna system. In operation, an alternating RF wave received by the antenna system is converted by the rectifier circuits and charge pump circuits into usable direct current (DC) voltage that can be used to power the operation of the passive RFID tag.

Harvesting sufficient power from the RF wave can be difficult since the voltage of the RF signal is in the range of approximately 200 millivolts, and a typical supply voltage for circuits of the RFID tag is one volt. Additionally, for relatively high-voltage operations in the RFID tag, such as for programming and erasing non-volatile memory in the RFID tag, a boosted voltage as high as 12 volts may be needed. Complicating matters is that the RF wave received by the RFID tag is not constantly provided, and can cease to be transmitted by the RFID reader without any notice. Thus, operation of passive RFID tags converting the low-level RF waveform to a usable voltage requires rectifiers and charge pump circuits that can generate usable voltage quickly and efficiently.

SUMMARY

One aspect provides a RFID tag including first and second antenna input signal nodes configured to receive first and second alternating input signals, respectively. The RFID tag further includes a power management unit having a plurality of successive stages, each stage coupled to the first and second antenna input nodes. At least one of the stages of the power management unit includes a dual-terminal rectifier device having first and second input terminals coupled to the first and second antenna input signal nodes, respectively. The dual-terminal rectifier further has an output terminal and a gate. The gate is configured to form a conductive channel that electrically couples the first and second input terminals to the output terminal in response to a gate voltage. The dual-terminal rectifier device is configured to rectify a combination of the alternating input signals applied to the input terminals of the semiconductor device to generate a rectified output signal at the output terminal.

Another aspect provides a method for generating a rectified output signal in a RFID tag. The method includes receiving first and second alternating signals and rectifying a combination of the first and second alternating input signals to generate the rectified output signal from a dual-terminal rectifier device. The dual-terminal rectifier device has first and second input terminals, an output terminal, and a gate configured to form a conductive channel to electrically couple the first and second input terminals to the output terminal in response to a gate voltage.

BRIEF DESCRIPTION OF THE DRAWINGS

FIGS. 3A and 3B are block diagrams of an implementation of an electrical circuit formed in an IC of the tag of FIG. 2.

FIG. 8 is a block diagram of a power rectifier according to embodiments for rectifying input signals from a plurality of antennas.

FIG. 9 is a block diagram of the power rectifier of the diagram of FIG. 8 according to embodiments.

FIGS. 11-13 are drawings of embodiments for an output stage of the power rectifier stage of FIG. 10.

FIGS. 14-18 are drawings of embodiments for an input stage of the power rectifier stage of FIG. 10.

FIGS. 19A, 19B illustrate examples of input signals under different biasing conditions during operation of the power rectifier stages of FIG. 10, in which bias circuits are applied, as shown in FIG. 13, FIG. 18, or both.

DETAILED DESCRIPTION

Certain details are set forth below to provide a sufficient understanding of the invention. However, it will be clear to one skilled in the art that the invention may be practiced without these particular details. Moreover, the particular embodiments of the present invention described herein are provided by way of example and should not be used to limit the scope of the invention to these particular embodiments. In other instances, well-known circuits, control signals, and timing protocols, have not been shown in detail in order to avoid unnecessarily obscuring the invention.

Figure 1:
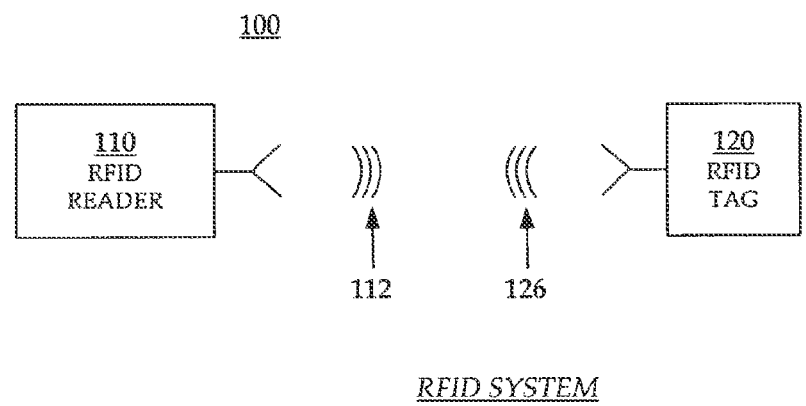
FIG. 1 is a block diagram of components of an RFID system.

FIG. 1 is a diagram of components of a typical RFID system 100, incorporating aspects of the invention. An RFID reader 110 transmits an interrogating RF wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active tag, i.e. having its own power source. Where tag 120 is a passive tag, it is powered from wave 112.

Figure 2:
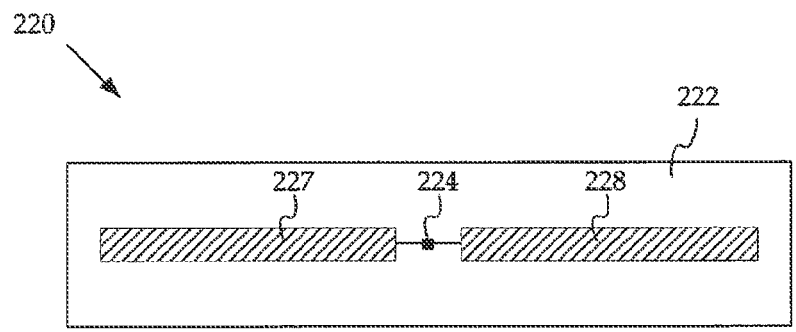
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an IC 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in this figure).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different places of the segment can be coupled to one or more of the antenna ports of IC 224. For example, the antenna can form a single loop, with its ends coupled to the ports. When the single segment has more complex shapes, it should be remembered that at, the frequencies of RFID wireless communication, even a single segment could behave like multiple segments.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, as known.

FIGS. 3A and 3B are block diagrams of an electrical circuit 330. Circuit 330 may be formed as an IC for an RFID tag, such as IC 224 of FIG. 2. Circuit 330 has a number of main components that are described in this document. Circuit 330 may have a number of additional components from what is shown and described, or different components, depending on the exact implementation.

Circuit 330 includes at least two antenna connections 332, 333, which are suitable for coupling to one or more antenna segments. Antenna connections 332, 333 may be made in any suitable way, such as pads and so on. In a number of embodiments more than two antenna connections are used, especially in embodiments where more antenna segments are used. An antenna 327 is electrically coupled to the antenna connection 332 and an antenna 328 is coupled to antenna connection 333. The antennas 327, 328 receive and couple an RF wave for use by the circuit 330. The antennas 327, 328 can be independent, having different polarization, physical location, and mode of operation. Antennas 327, 328 illustrated in FIG. 3A represent off-chip antennas that are not formed as part of an IC on which the circuit 330 is formed. In FIG. 3B, antenna 327 represents an off-chip antenna not formed as part of an IC on which the circuit 330 is formed and antenna 328 represents an on-chip antenna that is formed as part of the IC on which the circuit 330 is formed.

Circuit 330 includes a section 335. Section 335 may be implemented as shown, for example as a group of nodes for proper routing of signals. In some embodiments, section 335 may be implemented otherwise, for example to include a receive/transmit switch that can route a signal, and so on.

Circuit 330 also includes a Power Management Unit (PMU) 341. The PMU 341 harvests raw RF power received via antennas 327, 328. In some embodiments, PMU 341 includes at least one rectifier, and so on. In operation, an RF wave received via antennas 327, 328 is received by PMU 341, which in turn generates power for components of circuit 330. This is true for either or both of R→T sessions (when the received RF wave carries a signal) and T→R sessions (when the received RF wave carries no signal). More specifically, and as will be explained in more detail below, the PMU 341 includes circuitry that utilizes the alternating RF wave to generate rectified output signal that can be used to power components of the circuit 330. Additionally, the PMU 341 can include circuitry that converts alternating input signals and generates a relatively high-voltage output signal that can be used in operations where a boosted voltage is needed, for example, in programming or erasing a non-volatile memory, as known.

Circuit 330 additionally includes a demodulator 342. Demodulator 342 demodulates an RF signal received via antennas 327, 328. Demodulator 342 may be implemented in any way known in the art, for example including an attenuator stage, amplifier stage, and so on.

Circuit 330 further includes a processing block 344. Processing block 344 receives the demodulated signal from demodulator 342, and may perform operations. In addition, it may generate an output signal for transmission.

Processing block 344 may be implemented in any way known in the art. For example, processing block 344 may include a number of components, such as a processor, a memory, a decoder, an encoder, and so on.

Circuit 330 additionally includes a modulator 346. Modulator 346 modulates an output signal generated by processing block 344. The modulated signal is transmitted by driving antenna 327, 328, and therefore driving the load presented by the coupled antenna segment or segments. Modulator 346 may be implemented in any way known in the art, for example including a driver stage, amplifier stage, and so on.

In one embodiment, demodulator 342 and modulator 346 may be combined in a single transceiver circuit. In another embodiment, modulator 346 may include a backscatter transmitter or an active transmitter. In yet other embodiments, demodulator 342 and modulator 346 are part of processing block 344.

Figure 4:
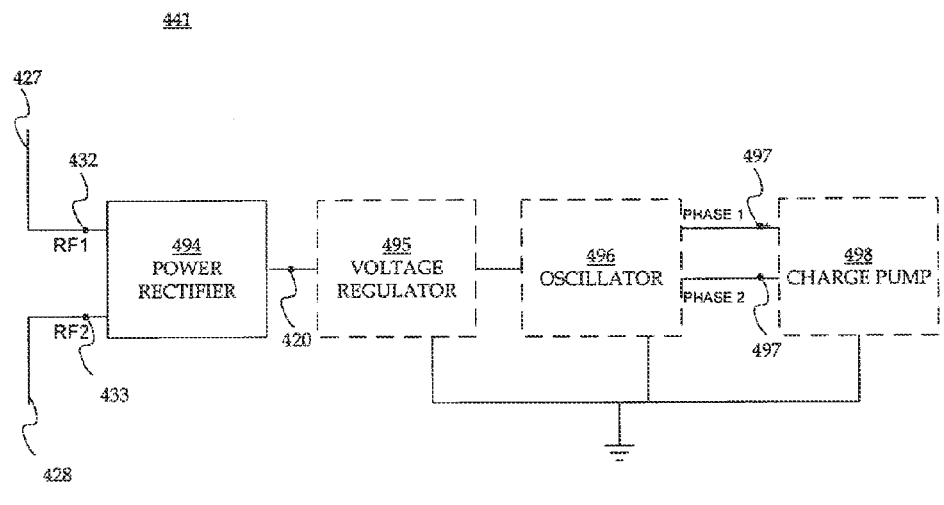
FIG. 4 is a block diagram illustrating components of a Power Management Unit of the circuit of FIG. 3.

FIG. 4 illustrates various components 441 that can be included in the PMU 341 (shown in FIG. 3). A power rectifier 494 is coupled to antennas 427, 428 through antenna connections 432, 433, respectively, to receive an input RF wave represented by input RF signals RF1, RF2. As will be explained in more detail below, the power rectifier 494 converts induced alternating current (AC) voltage in the antennas 427, 428 into usable DC voltage output at output node 427 that can be used to power the operation of the RFID tag 220. A voltage regulator 495 is coupled to receive the DC voltage generated by the power rectifier 494 and provide a regulated DC voltage to other circuitry of the RFID tag 220. One such circuit that receives the regulated DC voltage is an oscillator 496 that generates two alternating signals PHASE1 and PHASE2. Typically, the PHASE1 and PHASE2 signals are complementary, that is, 180 degrees out of phase relative to one another. The PHASE1 and PHASE2 signals are provided to inputs 497 of a charge pump 498 that is coupled to the oscillator 496. Charge pump 498 uses the alternating PHASE1 and PHASE2 signals to generate boosted DC voltage for use in high-voltage applications in the RFID tag 220.

As shown in FIG. 4, the various components 441 that are shown in dashed line are optionally included. For example, the voltage regulator 495, the oscillator 496, and the charge pump 498 are optionally included in the various components 441.

Figure 5:
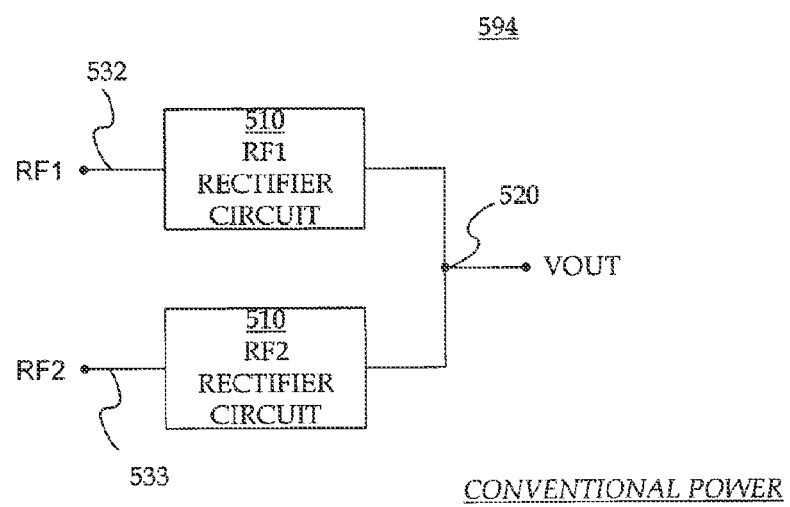
FIG. 5 is a block diagram of a conventional power rectifier for rectifying input signals from two antennas.

FIG. 5 is a conventional power rectifier 594 for rectifying first and second input RF signals RF1, RF2 to provide a rectified output signal at output 520. Generally, in a conventional design each input RF signal requires a separate rectifier.

For example, the power rectifier 594 includes two rectifier circuits 510, each of which rectifies a respective input RF signal and provides a rectified output signal to the output 520. The resulting rectified output signal at the output 520 results from the individually rectified output signals output by the respective rectifier circuits 510.

Figure 6:
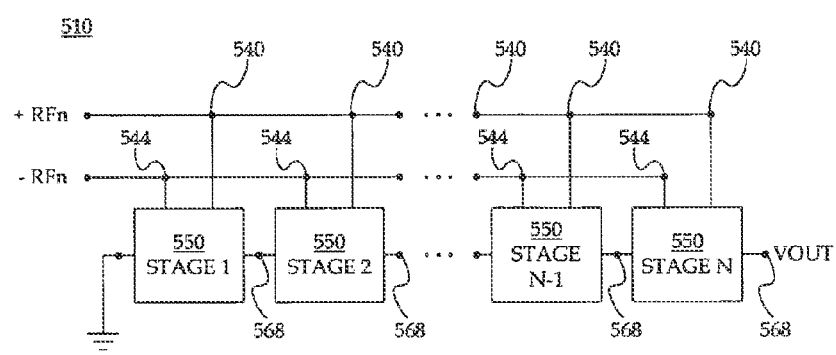
FIG. 6 is a drawing illustrating stages in the power rectifier of the diagram of FIG. 5.

FIG. 6 is a block diagram of one of the conventional rectifier circuits 510. The circuitry illustrated in FIG. 6 is repeated for each of the rectifier circuits 510 illustrated in the conventional power rectifier 594 of FIG. 5. The rectifier circuit 510 is a multi-stage rectifier that converts an input RF wave into usable DC voltage VOUT. The multi-stage rectifier circuit 510 includes a plurality of stages 550, labeled in FIG. 6 as stage 1 to stage N. The stages 550 are coupled in series with the output of a previous stage 550, represented by node 568, coupled to the input of a following stage 550. Each stage 550 receives at input nodes 540 and 544 first and second alternating signals +RFn and −RFn resulting from the respective input RF wave. With reference to FIG. 5, RFn represents either the RF1 signal or the RF2 signal. The +RFn and −RFn signals are generally 180 degrees out of phase relative to one another. In response to the +RFn and −RFn signals, the multi-stage rectifier circuit 510 provides the rectified output signal VOUT at the output 568 of the last stage N 550. Typically the stages 550 are identical in design and operation.

As illustrated by FIGS. 5 AND 6, much of the rectifying circuitry in conventional multi-antenna rectifiers, such as power rectifier 594, is duplicative. As previously discussed, each input RF signal is rectified through a respective rectifier circuit, which typically includes multiple rectifier stages. The redundant nature of the conventional design is inefficient and results in a poor use of chip area. In addition to an inefficient design, the efficiency of conventional rectifier stages 550 in rectifying input RF signals to generate a rectified output signal is relatively poor due to the short time that the +RFn and −RFn signals actually drive current through the respective stage, as will be described in more detail with reference to FIGS. 7A, 7B, AND 7C.

Figure 7A:
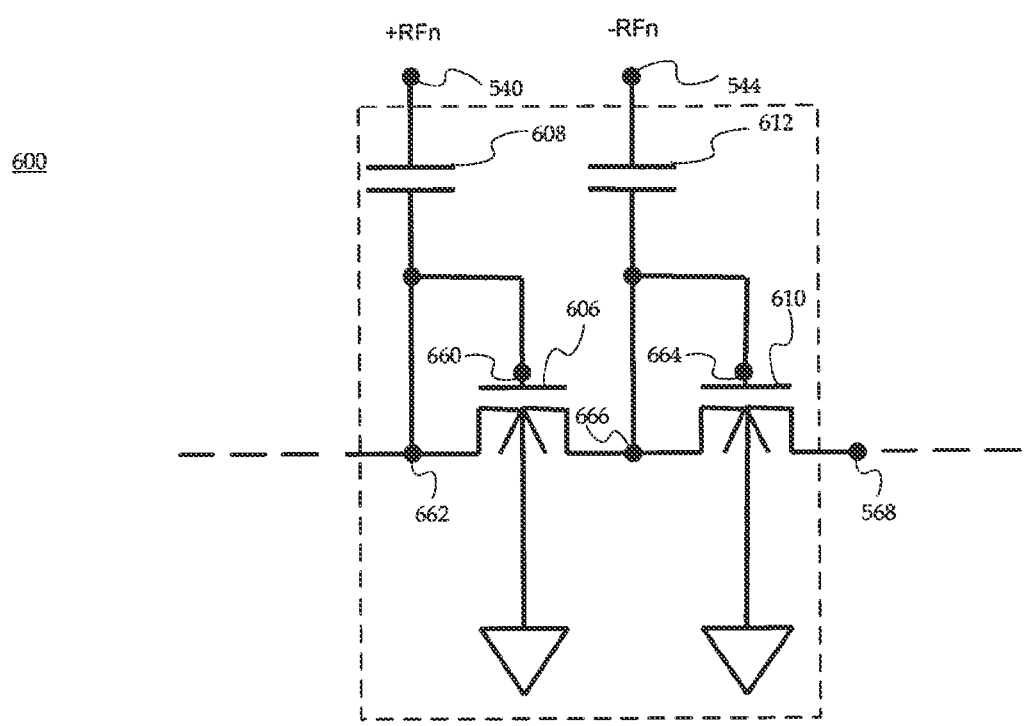
FIG. 7A is a schematic drawing of a prior art embodiment of a single power rectifier stage such as one of those depicted in FIG. 6.
Figure 7B:
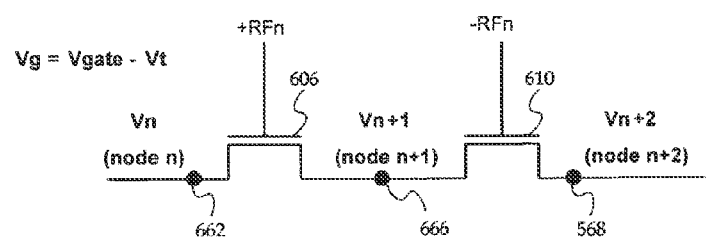
FIG. 7B is a simplified schematic drawing of the power rectifier stage of FIG. 7A.
Figure 7C:
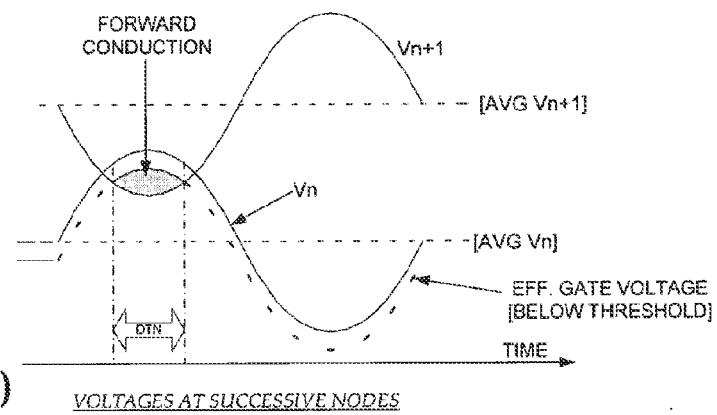
FIG. 7C illustrates an example of input signals during operation of the power rectifier stage of FIG. 7A.

FIG. 7A illustrates a conventional rectifier-pump stage 600 that can be included in stages 550 of the multi-stage rectifier circuit 510 shown in FIG. 6. The rectifier-pump stage 600 includes two diode-coupled transistors 606, 610 that are coupled in series. The transistors 606, 610 are coupled to capacitors 608, 612 for capacitively coupling the +RFn and −RFn signals (applied to nodes 540 and 544, respectively) to the gates 660, 664 and the sources 662, 666, all respectively. Operation of the conventional rectifier-pump stage 600 will be described with reference to FIGS. 7B and 7C in addition to FIG. 7A. FIG. 7B is a simplified drawing of the rectifier-pump stage 600 showing transistors 606, 610, the source 662 (labeled as node n and having a voltage Vn), the source 666 (labeled as node n+1 and having a voltage Vn+1), and the output 568 (labeled as node n+2 and having a voltage Vn+2). FIG. 7C illustrates input voltages Vn and Vn+1 during operation of the rectifier-pump stage 600.

In operation, for each transistor 606, 610 current is driven forward through the respective diode-coupled transistor when (1) the threshold voltage Vt of the transistor is exceeded, and (2) the voltage at a source for a previous transistor is greater than the voltage at a source for a following transistor. For example, during a "first phase," current is driven from the source 662 through the transistor 606 (in the present example, the "previous transistor") to the source 666 of the transistor 610 (in the present example, the "following transistor") as the alternating +RFn signal applied to the node 540 drives the voltage of the gate 660 to exceed Vt of the transistor 606 (condition 1) and drives the voltage of the source 662 to exceed the voltage at the source 666 of the transistor 610 (condition 2).

Typically, for +RFn and −RFn signals that are complementary, conditions (1) and (2) are met every cycle of the +RFn and −RFn signals for a short time where the negative voltage of the −RFn signal "overlaps" the positive voltage of the +RFn signal. This situation is illustrated in FIG. 7C, where the voltage Vn (corresponding to the +RFn signal) of node n exceeds the effective Vt of the transistor 606 (shown as a dashed line in FIG. 7C) and further exceeds the voltage Vn+1 (corresponding to the −RFn signal) of node n+1. The voltage of the +RFn signal overlaps the voltage of the −RFn signal for only the period DTN. During the short DTN period of overlapping voltages of the +RFn and −RFn signals, current is driven through the transistor 606 from the source 662 to increase the voltage at the source 666. As the +RFn and −RFn signals continue to alternate and the −RFn signal drives the source 666 to a voltage that is no longer less than the voltage at the source 662, the diode coupling of the transistor 606 prevents current from flowing back through the transistor 606 to decrease the voltage at the source 666.

Although not shown in FIG. 7A, a next stage 550 (FIG. 6) coupled to the output of the rectifier-pump stage 600 will receive current driven through the transistor 610 from the source 666 to the output 568 during a "second phase" where the −RFn signal drives the voltage at the gate 664 to exceed Vt and the source 666 to exceed the voltage at the output 568, which is coupled to the source of a following transistor in the next stage 550. These conditions are met during a short time where the positive voltage of the −RFn signal overlaps the negative voltage of the +RFn signal (applied to the following transistor in the next stage 550). As the +RFn and −RFn signals continue to alternate and the second phase comes to an end, the first phase begins again and the voltage at the output 568 (driven by the +RFn signal applied to the gate and source of the following transistor in the next stage 550) is no longer less than the voltage at the source 666, and the diode coupling of the transistor 610 prevents current from flowing back through the transistor 610 to decrease the voltage at the output 568.

As illustrated by the previous description, by applying the alternating +RFn and −RFn signals to the rectifier-pump stage 600, current is driven through the transistors 606 and 610 in two phases to provide a rectified output signal at the output 568 having a voltage greater than the voltage of the rectified signal provided to it from a previous rectifier-pump stage 600. However, the efficiency of the rectifier-pump stage 600 is relatively poor due to the short time that the +RFn and −RFn signals drive the respective gates and sources to meet the two conditions for driving a current forward to the next source. The shortness of time is in part due to the need for the +RFn and −RFn signals to drive the gates 606 and 664 to exceed the Vt of the transistor 606 and 610, respectively. In the conventional rectifier-pump 600, the effective voltage of the +RFn and −RFn signals for driving the gate and source is reduced by the Vt of the transistor.

FIG. 8 illustrates a multi-input power rectifier 894 according to an embodiment. In contrast to the conventional power rectifier 594 (FIG. 5), and as will be described in more detail below, the multi-input power rectifier 894 does not include a separate rectifiers for each input RF signal. The power rectifier 894 includes a rectifier circuit 810 that generates a rectified output signal VOUT at an output 820 in response to alternating input signals RF1 and RF2 applied to input terminals 831, 832. The power rectifier 894 is shown as a dual-input rectifier circuit that generates the VOUT signal from the two RF1 and RF2 signals. Although the embodiment of FIG. 8 is shown with two inputs 831, 832, alternative embodiments include multi-input rectifier circuits that have additional input terminals to which alternating signals are applied in generating a rectified output signal. The RF1 and RF2 signals are presented to the power rectifier 894 as unbalanced signals, which can be single-ended input signals, or in another embodiment, referenced to a common potential such as ground. As shown in FIG. 8, the RF1 and RF2 signals can be optionally referenced to ground GND1 838. The rectified VOUT signal can be optionally referenced to a potential as well, such as the VOUT signal 820 referenced relative to ground GND2, as also shown in FIG. 8.

FIG. 9 illustrates an embodiment of a rectifier circuit having a multi-stage rectifier design. A rectifier circuit 910 includes stages 1-N 950 coupled in series from a first stage 950 having an input 938 coupled to ground to a last stage 950 having an output 959 at which the rectified VOUT signal is provided. Each stage 950 includes input terminals 940, 944 coupled to first and second antenna input signal nodes at which the RF1 and RF2 signals are applied. The RF1 and RF2 signals are used to drive the stages 950 to generate a rectified output signal that is propagated through the stages 950 to the output 959. For example, as illustrated in FIG. 9, an output 951 of the first stage 950 is coupled to the input of a second stage 950 to provide a rectified output signal. The output 952 of the second stage 950 is coupled to a subsequent stage to continue propagating the rectified output signal through the stages 950 to an input 958 of a last stage N 950. Whereas the conventional rectifier circuit includes a multi-stage rectifier for each input RF signal, as previously discussed with reference to FIGS. 5 and 6, the multi-stage rectifier circuit 910 is capable of rectifying multiple input RF signals to provide the rectified VOUT signal.

Figure 10:
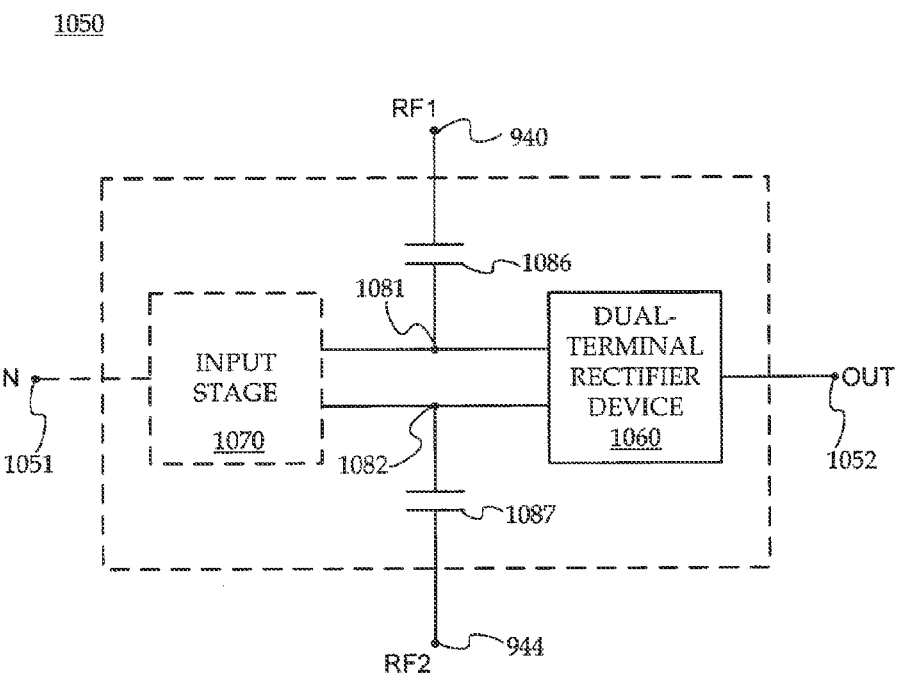
FIG. 10 is a block diagram of at least one of the power rectifier stages of FIG. 9 according to embodiments.

FIG. 10 illustrates an embodiment of a rectifier stage 1050 that can be used in at least one stage 950 of the rectifier circuit 910. A rectifier stage 1050 includes a dual-terminal rectifier device 1060. First and second input terminals 1081, 1082 of the dual-terminal rectifier device 1060 are coupled to receive the RF1, RF2 signals that are applied to the input terminals 940, 944 of the rectifier stage 1050. As shown in FIG. 10, the RF1 and RF2 signals are capacitively coupled through capacitors 1086, 1087, respectively, to the input terminals 1081, 1082. The dual-terminal rectifier device 1060 further includes an output terminal 1052 at which the rectified output signal OUT of the rectifier stage 1050 is provided. As will be described in more detail below, the dual-terminal rectifier device 1060 rectifies a combination of the RF1 and RF2 signals applied to the input terminals 1081, 1082 to generate the rectified OUT signal at the output terminal 1052.

The rectifier stage 1050 optionally includes a dual-terminal rectifier input stage 1070 having an input 1051 to which a rectified output signal OUT from a previous rectifier stage is applied. First and second output nodes of the dual-terminal rectifier input stage are coupled to the first and second input terminals 1081, 1082 of the dual-terminal rectifier device 1060. As will be described in more detail below, the dual-terminal rectifier input stage 1070 provides first and second rectified output signals at the first and second output nodes in response to an input signal IN applied to the input 1051.

FIG. 11 illustrates an embodiment of a dual-terminal rectifier device that can be substituted for the dual-terminal rectifier device 1060 shown in FIG. 10. A dual-terminal rectifier device 1160 includes a dual-source p-channel field-effect transistor (pFET) 1183. The first and second input terminals 1081, 1082 are coupled to respective sources of the dual-source pFET. A gate of the dual-source pFET 1183 is configured to form a conductive channel that electrically couples the first and second input terminals 1081, 1082 (via respective sources) to a drain of the dual-source pFET 1183 that is coupled to the output terminal 1052. The dual-source pFET 1183 can be used in rectifying a combination of the RF1 and RF2 signals applied to the input terminals 1081, 1082 to generate the rectified OUT signal.

FIG. 12 illustrates another embodiment of a dual-terminal rectifier device. A dual-terminal rectifier device 1260 also includes a dual-source pFET 1183 having input terminals 1081, 1082 coupled to a respective source, and a gate that is configured to electrically couple the sources to a drain. The drain is coupled to the output terminal 1052. In contrast to the dual-terminal rectifier device 1160, the gate and the drain of the pFET 1183 included in the dual-terminal rectifier device 1260 are coupled to provide a diode coupled device.

FIG. 13 illustrates another embodiment of a dual-terminal rectifier device.

A dual-terminal rectifier device 1360 also includes a dual-source pFET 1183 having input terminals 1081, 1082 coupled to a respective source, and a gate that is configured to electrically couple the sources to a drain, which is coupled to the output terminal 1052. The dual-terminal rectifier device 1360 further includes an output bias circuit 1388 coupled to the dual-source pFET 1183 that can be used to bias the gate to increase or reduce output efficiency of the rectifier stage 1050. The operation and implementation of various gate bias circuits are described in greater detail in commonly assigned U.S. patent application Ser. No. 11/236,709 to Oliver et al., filed Sep. 26, 2005, which is incorporated herein by reference. Although not specifically shown, in other embodiments the gate of the dual-source pFET 1183 can be coupled to the drain to provide a diode coupled device that is used with the output bias circuit 1388.

FIGS. 14-18 illustrate different embodiments of dual-terminal rectifier input stages that can be that can be substituted for the dual-terminal rectifier input stage 1070 shown in FIG. 10. As previously discussed, the dual-terminal rectifier input stage 1070 provides first and second output signals at first and second output nodes in response to an input signal.

FIG. 14 illustrates a dual-terminal rectifier input stage 1470 that includes a dual-output diode 1483 having first and second output nodes coupled to the first and second input terminals 1081, 1082 of the dual-terminal rectifier device 1060 (FIG. 10). FIG. 15 illustrates another embodiment of a dual-terminal rectifier input stage. A dual-terminal input stage 1570 includes first and second diodes 1584, 1585. Each diode is coupled to a respective one of the first and second input terminals 1081, 1082 of the dual-terminal rectifier device 1060.

FIGS. 16-18 illustrate embodiments of dual-terminal rectifier input stages that utilize a dual-source n-channel field effect transistor (nFET). FIG. 16 illustrates dual-terminal rectifier input stage 1670 including a dual-source nFET 1686 having first and second sources coupled to the input terminals 1081, 1082. The dual-source nFET 1686 further has a gate that is configured to form a conductive channel that electrically couples the first and second sources to a drain of the dual-source nFET that is coupled to the input terminal 1051. FIG. 17 illustrates a dual-terminal rectifier input stage 1770 having a dual-source nFET 1686 with a gate coupled to a drain to form a diode coupled device. FIG. 18 illustrates a dual-terminal rectifier input stage 1870 having a dual-source nFET 1686 and further having an input bias circuit 1888. As previously discussed with reference to the dual-source pFET 1183 coupled to the output bias circuit 1388 shown in FIG. 13, the input bias circuit 1888 provides a voltage bias to the gate of the dual-source nFET 1686 to increase or decrease efficiency of the rectifier stage 1050. Although not specifically shown, in other embodiments the gate of the dual-source nFET 1686 can be coupled to the drain to provide a diode coupled device that is used with the input bias circuit 1888.

As previously mentioned, output and input bias circuits 1388, 1888 can be used to adjust efficiency of the output and input circuitry of the rectifier stage 1050. Although a more detailed description of the operation of bias circuits is provided in the aforementioned U.S. Patent Application to Oliver et al., the effect of the input bias circuit 1888 on the dual-source nFET 1686 is summarized below with reference to FIGS. 19A and 19B. The effect described for the input bias circuit 1888 is generally applicable for the output bias circuit 1388 as well.

FIG. 19A illustrates a condition where the bias voltage provided by the input bias circuit 1888, represented in FIG. 19A by the battery 1914-C, is approximately equal to the Vt of the dual-source nFET 1686. Under this condition, the period of overlap between voltage Vn (corresponding to an input signal) and voltage Vn+1 (corresponding to the RF1 or RF2 signal), shown in FIG. 19A as DTE, is greater in comparison to the overlap DTN for the conventional rectifier-pump stage 600 previously described with respect to FIGS. 7A, 7B AND 7C. The greater overlap reflects greater efficiency compared to the conventional rectifier-pump stage 600.

FIG. 19B illustrates a condition where the bias voltage provided by the input bias circuit 1888, represented in FIG. 19B by the battery 1914-D, which is larger than the battery 1914-C, is greater than the Vt of the dual-source nFET 1686. Under this condition, the period of overlap between voltage Vn (corresponding to an input signal) and voltage Vn+1 (corresponding to the RF1 or RF2 signal), shown in FIG. 19B as DTE, is greater in comparison to the overlap DTN between the same voltages for the conventional rectifier-pump stage 600 previously described with respect to FIGS. 7A, 7B AND 7C. Additionally, due to the bias voltage being in excess of the Vt of dual-source nFET 1686, reverse conduction, that is, current flowing back through the dual-source nFET 1686 from the sources to the drain, occurs whenever there is not forward conduction. The reverse conduction allows the voltage at the sources to decrease.

As described in greater detail in the aforementioned U.S. Patent Application to Oliver et al., adjustable bias circuits enable the bias voltage applied to the gate of a transistor to be adjusted to adjust the efficiency of the rectifier circuitry. For example, under light loads the adjustable bias circuit can be adjusted to provide a condition similar to that depicted in and described with reference to FIG. 19A, whereas under heavy loads the adjustable bias circuit can be adjusted to provide a condition similar to that depicted in and described with reference to FIG. 19B.

Figure 20:
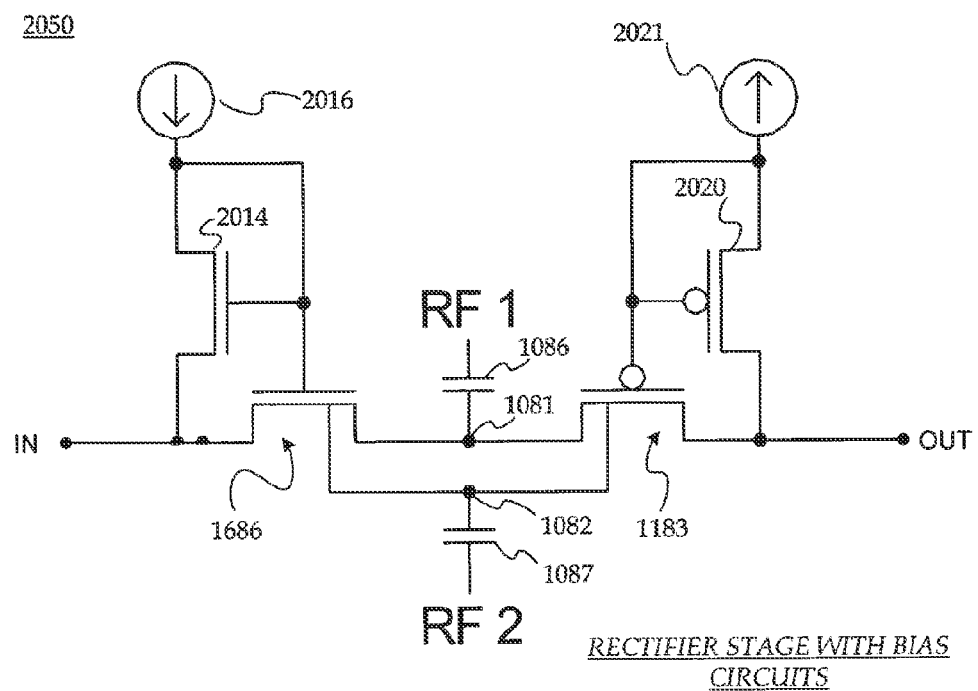
FIGS. 20-23 are schematic drawings of embodiments of FIG. 10, in which bias circuits are applied, as shown in FIG. 13 and FIG. 18.

FIG. 20 illustrates another embodiment of a rectifier stage that can be substituted for a rectifier stage 950 of the multi-stage rectifier circuit 910. A rectifier stage 2050 includes a dual-source pFET rectifier device 1183 having first and second input terminals 1081, 1082 coupled to sources of a dual-source nFET rectifier input stage 1686. Input RF signals RF1 and RF2 are capacitively coupled through capacitors 1086, 1087 to a respective input terminal of the dual-source pFET rectifier device 1183. A pFET reference transistor 2020 and current source 2021 represent an output bias circuit for biasing the gate of the dual-source pFET rectifier device 1183. An input bias circuit for biasing the gate of the dual-source nFET rectifier input stage 1686 is represented by a nFET reference transistor 2014 and a current source 2016.

In operation, a combination of the alternating RF1 and RF2 signals are rectified by the dual-source pFET rectifier device 1183. Additionally, the dual-source nFET rectifier input stage 1686 rectifies an input signal IN to provide first and second rectified output signals to the dual-sources of the pFET rectifier device 1183. Input and output bias circuits provide gate biases to the respective dual-source transistor to improve efficiency of the rectifier stage 2050. The rectified output signal OUT is generated by driving current through the dual-source pFET rectifier device 1183 that results from a combination of the alternating RF1 and RF2 signals, and the first and second rectified output signals from the dual-source nFET rectifier input stage 1686.

Figure 21:
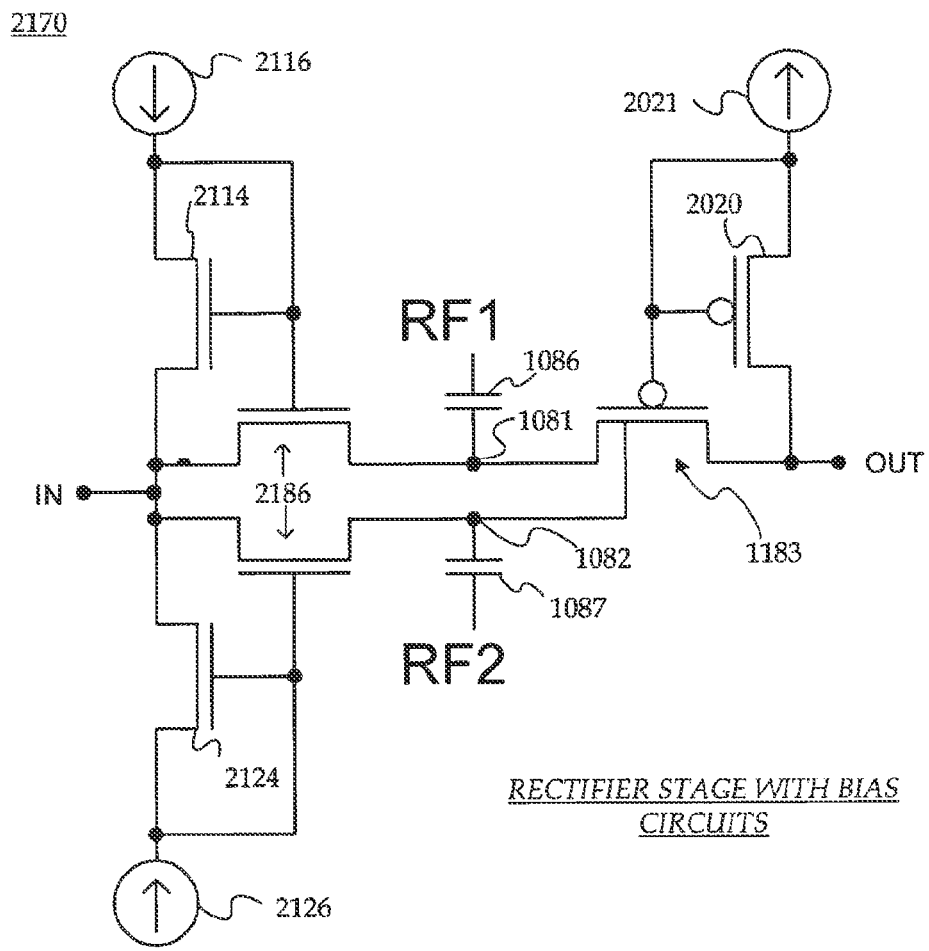

FIG. 21 illustrates another embodiment of a rectifier stage that can be substituted for a rectifier stage 950 of the multi-stage rectifier circuit 910. A rectifier stage 2170 includes a dual-source pFET rectifier device 1183 having first and second input terminals 1081, 1082. Input RF signals RF1 and RF2 are capacitively coupled through capacitors 1086, 1087 to a respective input terminal of the dual-source pFET rectifier device 1183. The rectifier stage 2170 further includes a dual-terminal rectifier input stage represented by first and second nFETs 2186. Each nFET 2186 has a drain coupled to an input to the stage 2170 and a source coupled to a respective one of the first and second input terminals 1081, 1082. An output bias circuit, represented by pFET reference transistor 2020 and a current source 2021, is included in the rectifier stage 2170 for biasing the gate of the dual-source pFET rectifier device 1183. Each of the nFETs 2186 is coupled to a respective input bias circuit. The first nFET 2186 is coupled to the input bias circuit represented by nFET reference transistor 2114 and current source 2116. The second nFET 2186 is coupled to the input bias circuit represented by nFET reference transistor 2124 and current source 2126.

In operation, the rectified output signal OUT is generated by driving current through the dual-source pFET rectifier device 1183 that results from a combination of the alternating RF1 and RF2 signals, and the first and second rectified output signals from the nFETs 2186 of the rectifier input stage 1686. Input and output bias circuits provide gate biases to the nFETs 2186 and the dual-source pFET rectifier device 1183 to improve efficiency of the rectifier stage 2170.

Figure 22:
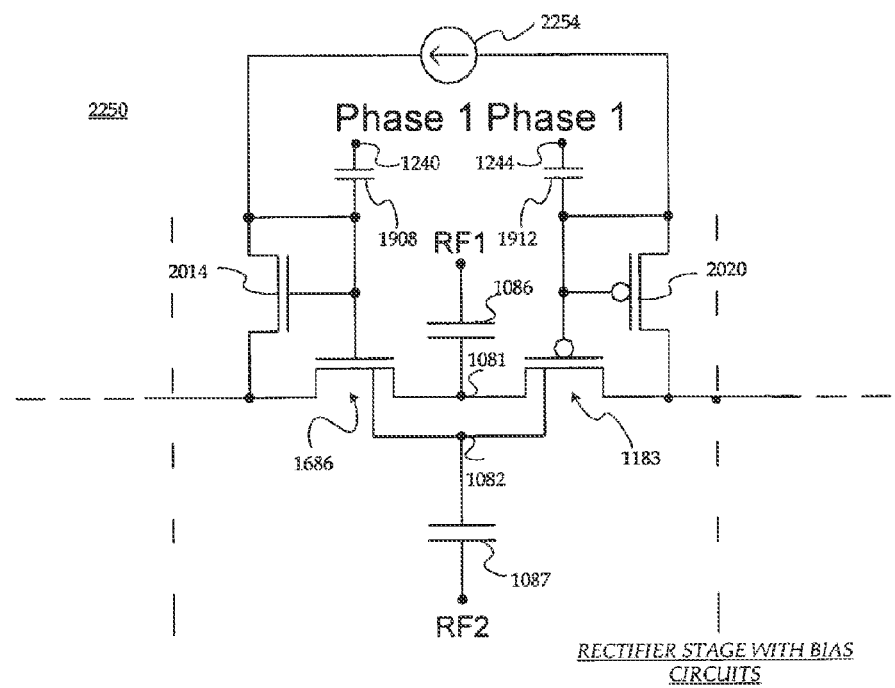

FIG. 22 illustrates another embodiment of a rectifier stage that can be substituted for a rectifier stage 950 of the multi-stage rectifier circuit 910. A rectifier stage 2250 includes a dual-source pFET rectifier device 1183 having first and second input terminals 1081, 1082 coupled to sources of a dual-source nFET rectifier input stage 1686. Input RF signals RF1 and RF2 are capacitively coupled through capacitors 1086, 1087 to a respective input terminal of the dual-source pFET rectifier device 1183. A current source 2254, pFET reference transistor 2020, and nFET reference transistor 2014 represent a combined bias circuit for biasing the gates of the dual-source pFET rectifier device 1183 and the dual-source nFET rectifier input stage 1686. The current source 2254 circulates a bias current from the pFET reference transistor 2020 to the nFET reference transistor 2014 to generate the respective gate bias. The bias circuit further includes capacitors 1908, 1912 for capacitively coupling an alternating input signal PHASE1 applied to nodes 1240, 1244 to the gates of the dual-source pFET and nFET devices 1183, 1686. The PHASE1 signal has a phase that is relative to either the RF1, RF2 input signals to coordinate pumping of current through the dual-source pFET and nFET devices 1183, 1686.

Figure 23:
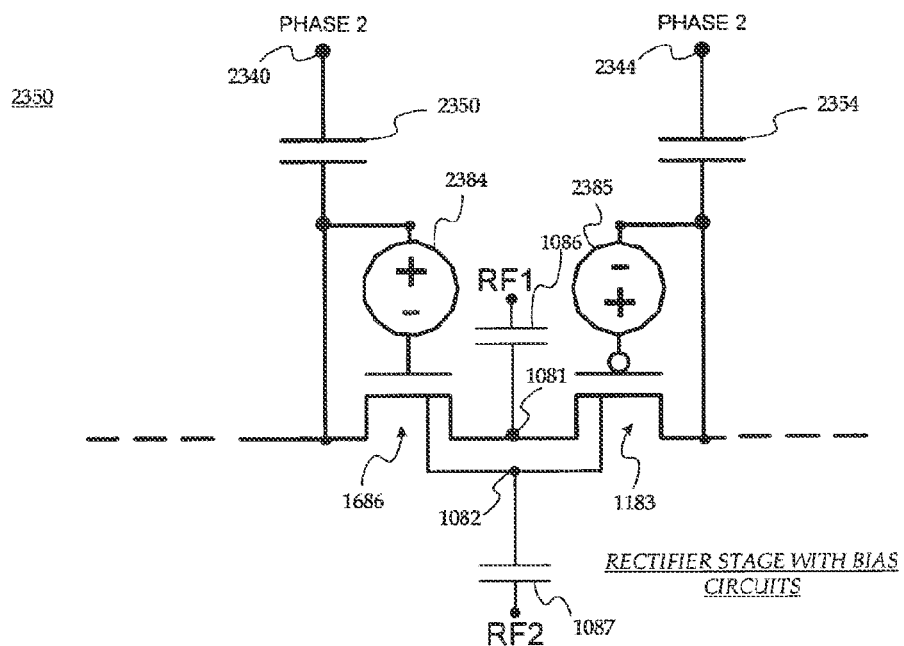

FIG. 23 illustrates another embodiment of a rectifier stage that can be substituted for a rectifier stage 950 of the multi-stage rectifier circuit 910. A rectifier stage 2350 includes a dual-source pFET rectifier device 1183 having first and second input terminals 1081, 1082 coupled to sources of a dual-source nFET rectifier input stage 1686. Input RF signals RF1 and RF2 are capacitively coupled through capacitors 1086, 1087 each to a respective input terminal of the dual-source pFET rectifier device 1183. Output and input bias circuits are represented by voltage sources 2385 and 2384, respectively. An alternating input signal PHASE2 applied to nodes 2340, 2344 is capacitively coupled to the voltage sources 2384, 2385 via capacitors 2350, 2354, respectively. The PHASE2 signal has a phase relative to either the RF1, RF2 input signals to coordinate pumping of current through the dual-source pFET and nFET devices 1183, 1686. Voltage sources 2384 and 2385 provide gate biases to the dual-source nFET rectifier input stage 1686 and the dual-source pFET rectifier device 1183 to improve efficiency of the rectifier stage 2350.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for generating a rectified output signal in a RFID tag, the method comprising:
    receiving first and second alternating signals;
    rectifying a combination of the first and second alternating input signals to generate the rectified output signal, wherein,
    the rectified output signal is generated from a dual-terminal rectifier device having first and second input terminals, an output terminal, and a gate configured to form a conductive channel to electrically couple the first and second input terminals to the output terminal in response to a gate voltage;
    rectifying the combination includes applying a first rectified signal to the first input terminal of the dual-terminal rectifier device and applying a second rectified signal to the second input terminal of the dual-terminal rectifier device; and
    applying the first and second rectified signals comprises rectifying an input signal through a dual-output diode having a first output coupled to the first input of the dual-terminal rectifier device and further having a second output coupled to the second input of the dual-terminal rectifier device.

2. The method of claim 1, wherein:
    the dual-terminal rectifier device includes a dual-source field effect transistor; and
    rectifying the combination includes applying the first and second alternating signals to sources of the dual-source field effect transistor.

3. The method of claim 2, wherein the dual-source field effect transistor has a gate coupled to a drain.

4. The method of claim 3, further comprising adding a bias voltage to the gate of the dual-source field effect transistor.

5. A method for generating a rectified output signal in a RFID tag, the method comprising:
    receiving first and second alternating signals; and
    rectifying a combination of the first and second alternating signals to generate the rectified output signal, wherein,
        the rectified output signal is generated from a dual-terminal rectifier device having first and second input terminals, an output terminal, and a gate configured to form a conductive channel to electrically couple the first and second input terminals to the output terminal in response to a gate voltage;

rectifying the combination includes applying a first rectified signal to the first input terminal of the dual-terminal rectifier device and applying a second rectified signal to the second input terminal of the dual-terminal rectifier device; and applying the first and second rectified signals comprises rectifying an input signal through a dual-source field effect transistor having a first source coupled to the first input terminal of the dual-terminal rectifier device and further having a second source coupled to the second input terminal of the dual-terminal rectifier device.

6. The method of claim 5 wherein the dual-source field effect transistor has a gate and the method further comprises providing a bias voltage to the gate.

7. The method of claim 5, further comprising:
applying a first bias current to a source of a first reference transistor having a gate terminal and a source coupled to the gate of the dual-terminal rectifier device, and further having a drain terminal coupled to the output of the dual-terminal rectifier device; and
applying a second bias current to a source of a second reference transistor having a gate terminal and a drain coupled to a gate of the dual-terminal rectifier input stage, and further having a source terminal coupled to the input of the dual-terminal rectifier input stage.

8. The method of claim 5, further comprising:
applying a bias current to a source of a first reference transistor and to a drain of a second reference transistor, the first reference transistor having a gate terminal and a source coupled to the gate of the dual-terminal rectifier device, and further having a drain terminal coupled to the output of the dual-terminal rectifier device, the second reference transistor having a gate terminal and a drain coupled to a gate of the dual-terminal rectifier input stage, and further having a source terminal coupled to the input of the dual-terminal rectifier input stage.

9. The method of claim 5, further comprising:
applying a first gate bias to the gate of the dual-terminal rectifier device; and
applying a second gate bias to a gate of the dual-source field effect transistor.

10. The method of claim 5, wherein:
the dual-terminal rectifier device includes another dual-source field effect transistor; and
rectifying the combination includes applying the first and second alternating signals to sources of the other dual-source field effect transistor.

11. The method of claim 10, wherein the other dual-source field effect transistor has a gate coupled to a drain.

12. The method of claim 11, further comprising adding a bias voltage to the gate of the other dual-source field effect transistor.

13. A method for generating a rectified output signal in a RFID tag, the method comprising:
receiving first and second alternating signals; and
rectifying a combination of the first and second alternating signals to generate the rectified output signal, wherein,
the rectified output signal is generated from a dual-terminal rectifier device having first and second input terminals, an output terminal, and a gate configured to form a conductive channel to electrically couple the first and second input terminals to the output terminal in response to a gate voltage;
rectifying the combination includes applying a first rectified signal to the first input terminal of the dual-terminal rectifier device and applying a second rectified signal to the second input terminal of the dual-terminal rectifier device; and
applying the first and second rectified signals comprises rectifying an input signal through a first diode having an output coupled to the first input of the dual-terminal rectifier device and rectifying the input signal through a second diode having an output coupled to the second input of the dual-terminal rectifier device.

14. The method of claim 13, wherein:
the dual-terminal rectifier device includes a dual-source field effect transistor; and
rectifying the combination includes applying the first and second alternating signals to sources of the dual-source field effect transistor.

15. The method of claim 14, wherein the dual-source field effect transistor has a gate coupled to a drain.

16. The method of claim 15, further comprising adding a bias voltage to the gate of the dual-source field effect transistor.

* * * * *